(12) United States Patent
Fukuhara et al.

(10) Patent No.: US 11,704,517 B2
(45) Date of Patent: Jul. 18, 2023

(54) IMAGE FORMING APPARATUS

(71) Applicant: CANON KABUSHIKI KAISHA, Tokyo (JP)

(72) Inventors: Riki Fukuhara, Chiba (JP); Koji Yumoto, Ibaraki (JP); Shin Iwasaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/825,105

(22) Filed: May 26, 2022

(65) Prior Publication Data

US 2022/0383056 A1 Dec. 1, 2022

(30) Foreign Application Priority Data

May 27, 2021 (JP) .................. 2021-089376

(51) Int. Cl.
*G06K 15/02* (2006.01)
*G06K 15/00* (2006.01)
*G03G 15/00* (2006.01)

(52) U.S. Cl.
CPC .......... *G06K 15/027* (2013.01); *G03G 15/55* (2013.01); *G06K 15/408* (2013.01)

(58) Field of Classification Search
CPC ..... G06K 15/027; G06K 15/408; G03G 15/55
See application file for complete search history.

(56) References Cited

U.S. PATENT DOCUMENTS 9,213,294 B2 * 12/2015 Saito .................. G03G 15/556
2019/0243295 A1 * 8/2019 Ishii ..................... G03G 15/55

FOREIGN PATENT DOCUMENTS

JP 2014-107648 A 6/2014

* cited by examiner

*Primary Examiner* — Quang N Vo
(74) *Attorney, Agent, or Firm* — Venable LLP

(57) ABSTRACT

An image forming apparatus includes an image forming unit configured to form an image on an image bearing member based on an image forming condition; a transfer unit configured to transfer the image formed on the image bearing member onto a sheet; a first reading sensor configured to read a first image for adjustment which has been formed on the sheet; a second reading sensor configured to read a second image for adjustment which has been formed on the image bearing member; and a controller configured to: generate the image forming condition based on reading results of the first image for adjustment on a plurality of sheets, which are obtained by the first reading sensor; and generate the image forming condition based on a reading result of the second image for adjustment, which is obtained by the second reading sensor.

6 Claims, 10 Drawing Sheets

IMAGE FORMING APPARATUS

BACKGROUND OF THE INVENTION

Field of the Invention

The present disclosure relates to an image forming apparatus, such as a printer, a copying machine, a facsimile machine, or a multifunction apparatus.

Description of the Related Art

An electrophotographic image forming apparatus forms (prints) an image on a sheet by the steps of forming an electrostatic latent image on a photosensitive member; developing the electrostatic latent image and transferring the electrostatic latent image onto the sheet; and fixing the transferred image to the sheet. The image formed on the sheet has an image density changed due to environmental conditions including temperature and humidity and deterioration of a developer used for the development. The image forming apparatus forms an image for adjustment for adjusting the image density, and adjusts image forming conditions and creates a tone correction table based on a result of reading this image for adjustment by a sensor, to thereby achieve stabilization of the image density. This is called "calibration." The calibration is feedback control, and there are cases in which the calibration is performed through use of a reading result of an image for adjustment formed on a sheet and in which the calibration is performed through use of a reading result of an image for adjustment on an image bearing member before being transferred onto the sheet.

In U.S. Pat. No. 9,213,294 B2, there is disclosed an image forming apparatus that measures an image for adjustment formed on a photosensitive member through use of a built-in sensor and performs calibration based on a measurement result of the image for adjustment. This image forming apparatus corrects, for example, intensity of laser light for exposing the photosensitive member as an image forming condition. In Japanese Patent Application Laid-open No. 2014-107648, there is disclosed an image forming apparatus that performs calibration by forming an image for adjustment in a margin area of a sheet on which an image (user image) corresponding to an instruction from a user is formed. With the forming of the image for adjustment in the margin area, the calibration is performed in real time. The margin area in which the image for adjustment is formed is an area in an outer edge portion of the sheet which is to be cut off. This image forming apparatus can maintain an appropriate image forming condition while suppressing a decrease in productivity by avoiding interruption of an image forming operation.

When the calibration is performed by printing an image for adjustment in the margin area of the sheet, the image for adjustment on the sheet is read by a sensor. In order to suppress variations in reading by the sensor, the sensor reads the image for adjustment printed on a plurality of sheets of the same type. The calibration is performed based on an average value of the reading results, to thereby improve the accuracy of calibration. However, when the reading of the image for adjustment fails due to a sensor abnormality or when a predetermined number of sheets of the same type are not provided, sufficient reading results cannot be obtained. Therefore, calibration is not performed, and the stability of the image quality of images cannot be guaranteed. In view of the above-mentioned problems, the present disclosure has an object to provide an image forming apparatus that appropriately adjusts an image forming condition and forms an image having stable image quality on a sheet.

SUMMARY OF THE INVENTION

An image forming apparatus according to one embodiment of the present disclosure includes: an image forming unit configured to form an image on an image bearing member based on an image forming condition; a transfer unit configured to transfer the image formed on the image bearing member onto a sheet; a first reading sensor configured to read a first image for adjustment which has been formed on the sheet; a second reading sensor configured to read a second image for adjustment which has been formed on the image bearing member; and a controller configured to: generate the image forming condition based on reading results of the first image for adjustment on a plurality of sheets, which are obtained by the first reading sensor; and generate the image forming condition based on a reading result of the second image for adjustment, which is obtained by the second reading sensor, wherein the controller is configured to: determine whether a reading result of the first image for adjustment, which has been obtained by the first reading sensor, is abnormal; and control, based on a result of the determination, whether to generate the image forming condition based on the reading result of the second image for adjustment, which has been obtained by the second reading sensor, without use of the reading results of the first image for adjustment on the plurality of sheets, which have been obtained by the first reading sensor.

An image forming apparatus according to another embodiment of the present disclosure includes an image forming unit configured to form an image on an image bearing member based on an image forming condition; a transfer unit configured to transfer the image formed on the image bearing member onto a sheet; a first reading sensor configured to read a first image for adjustment which has been formed on the sheet; a second reading sensor configured to read a second image for adjustment which has been formed on the image bearing member; and a controller configured to: generate the image forming condition based on reading results of the first image for adjustment on a plurality of sheets, which are obtained by the first reading sensor; and generate the image forming condition based on a reading result of the second image for adjustment, which is obtained by the second reading sensor, wherein the controller is configured to: determine whether a paper type of the sheet on which the first image for adjustment is formed has changed; and control, based on a result of the determination, whether to generate the image forming condition based on the reading result of the second image for adjustment, which has been obtained by the second reading sensor, without use of the reading results of the first image for adjustment on the plurality of sheets, which have been obtained by the first reading sensor.

Further features of the present invention will become apparent from the following description of exemplary embodiments (with reference to the attached drawings).

DESCRIPTION OF THE EMBODIMENTS

Now, an embodiment of the present disclosure is described in detail with reference to the accompanying drawings.

<Image Processing System>

Figure 1:
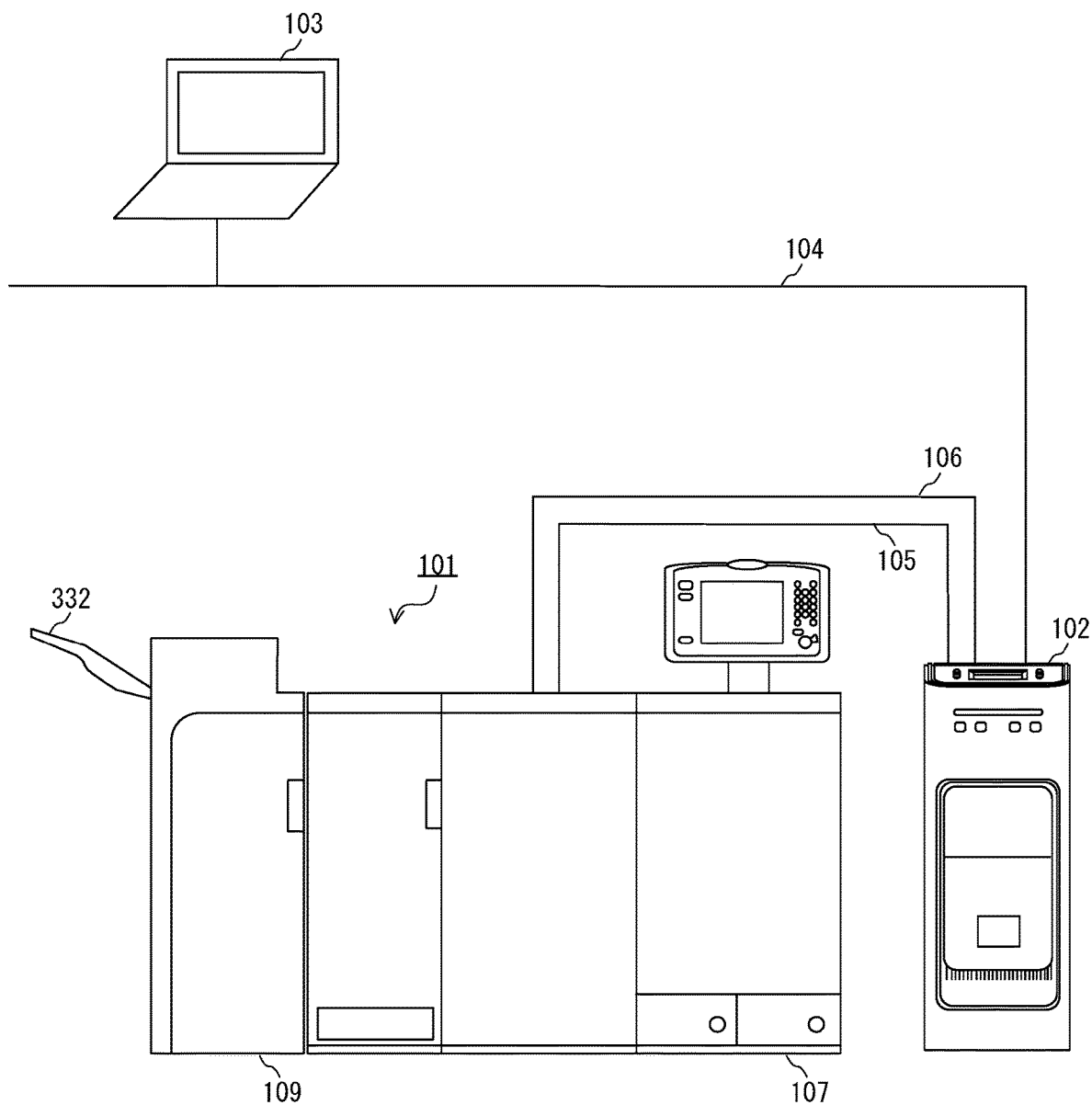
FIG. 1 is a configuration diagram of an image processing system.

FIG. 1 is a configuration diagram of an image processing system including an image forming apparatus according to this embodiment. The image processing system includes an image forming apparatus 101 and an external controller 102. Examples of the image forming apparatus 101 include a multifunction apparatus and a multifunction peripheral (MFP). Examples of the external controller 102 include an image processing controller, a digital front end (DFE), and a print server.

The image forming apparatus 101 and the external controller 102 are connected to each other so as to enable communication therebetween through an internal local area network (LAN) 105 and a video cable 106. The external controller 102 is connected to a client personal computer (PC) 103 through an external LAN 104. The external controller 102 obtains a print instruction (print job) from the client PC 103.

A printer driver having a function of converting an image into a print description language that can be processed by the external controller 102 is installed on the client PC 103. A user can instruct printing through the printer driver by various applications. The printer driver transmits a print job including image data to the external controller 102 based on a job instructed from the user. The external controller 102 receives the print job from the client PC 103, performs data analysis and rasterization processing on the image data included in the print job, and instructs the image forming apparatus 101 to print (to perform image formation) based on the image data.

The image forming apparatus 101 is configured by connecting a plurality of apparatus having different functions including a printing apparatus 107 to one another, and can perform complicated printing processing including bookbinding. The image forming apparatus 101 according to this embodiment includes the printing apparatus 107 and a finisher 109. The printing apparatus 107 forms an image on a sheet fed from a sheet feeder provided at a lower part of a main body, through use of a developer (for example, toner). The printing apparatus 107 forms yellow (Y), magenta (M), cyan (C), and black (K) images. A full-color image in which the images in the respective colors are superimposed on one another is formed on the sheet. The sheet having the image formed thereon is conveyed from the printing apparatus 107 to the finisher 109. The finisher 109 stacks such sheets having images formed thereon onto a stack tray 332. In addition, the finisher 109 in this embodiment has a function of cutting off a margin area in an outer edge portion of a sheet on which images for adjustment are formed as described later.

This image processing system is configured by connecting the external controller 102 to the image forming apparatus 101, but the external controller 102 is not always required. For example, the image forming apparatus 101 may be configured to obtain the print job including the image data directly from the client PC 103 through the external LAN 104. In this case, the image forming apparatus 101 is configured to perform the data analysis and rasterization processing that are supposed to be performed by the external controller 102. That is, the image forming apparatus 101 and the external controller 102 may be integrally configured.

<System Configuration>

Figure 2:
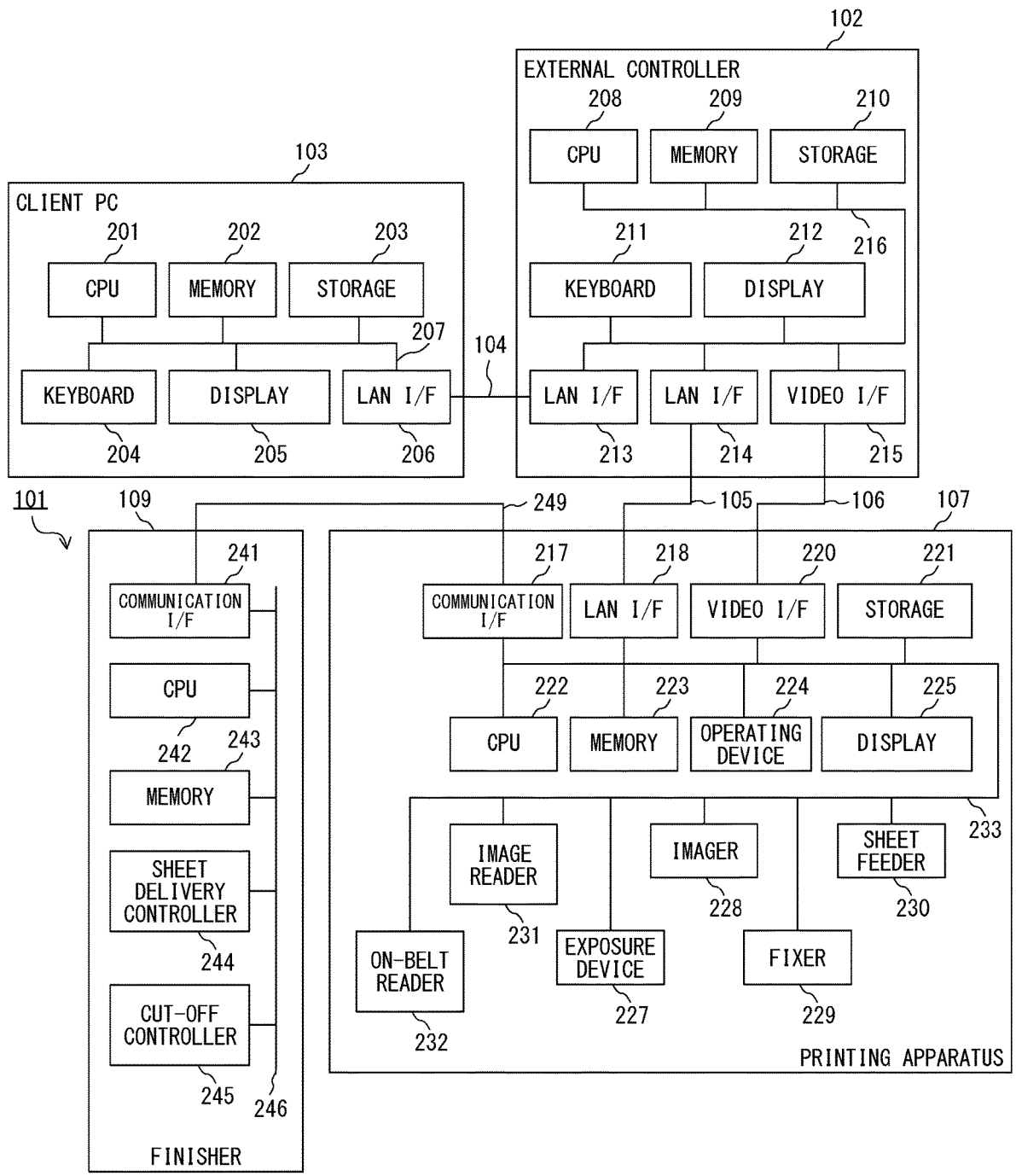
FIG. 2 is a system configuration diagram for illustrating how to control operations of the image processing system.

FIG. 2 is a system configuration diagram for illustrating how to control operations of the image processing system. In this case, a system configuration of each of the image forming apparatus 101, the external controller 102, and the client PC 103 is described.

Printing Apparatus

The printing apparatus 107 includes a communication interface I/F 217, a LAN I/F 218, and a video I/F 220 in order to communicate to/from other apparatus. The printing apparatus 107 includes a central processing unit (CPU) 222, a memory 223, a storage 221, an image reader 231, and an on-belt reader 232 in order to control operations of the printing apparatus 107. The printing apparatus 107 includes an exposure device 227, an imager 228, a fixer 229, and a sheet feeder 230 in order to form an image. The printing apparatus 107 includes an operating device 224 and a display 225 as user interfaces. Those components are connected to one another through a system bus 233 so as to enable communication to/from one another.

The communication I/F 217 is connected to the finisher 109 through a communication cable 249, and controls communication to/from the finisher 109. When the printing apparatus 107 and the finisher 109 operate in cooperation with each other, information and data are transmitted and received through intermediation of the communication I/F 217. The LAN I/F 218 is connected to the external controller 102 through the internal LAN 105, and controls communication to/from the external controller 102. The printing apparatus 107 receives a print setting and image data from the external controller 102 through intermediation of the LAN I/F 218. The video I/F 220 is connected to the external controller 102 through the video cable 106, and controls communication to/from the external controller 102. The printing apparatus 107 receives image data representing an image to be printed from the external controller 102 through intermediation of the video I/F 220.

The CPU 222 executes computer programs stored in the storage 221 to comprehensively perform image processing and image forming processing (printing control). The memory 223 provides a work area for the CPU 222 to execute various kinds of processing. In a case of performing image forming processing, the CPU 222 controls the exposure device 227, the imager 228, the fixer 229, and the sheet feeder 230.

The exposure device 227 includes a photosensitive member, a charging wire which charges the photosensitive member, and a light source which exposes the photosensitive member to light in order to form an electrostatic latent image on the photosensitive member. The photosensitive member is, for example, a photosensitive belt having a photosensitive layer formed on a surface of a belt-like elastic member or a photosensitive drum having a photosensitive layer formed on a surface of a cylinder. In place of the charging wire, a charging roller may be used. The exposure device 227 charges a surface of the photosensitive member to a uniform negative potential through use of the charging wire. The exposure device 227 outputs laser light from the light source based on the image data. The laser light is scanned across the surface of the photosensitive member that has been uniformly charged. Thus, a potential of the photosensitive member changes at a position irradiated with the laser light, and an electrostatic latent image is formed on the surface of the photosensitive member. Four photosensitive members are provided in correspondence with the four colors of yellow (Y), magenta (M), cyan (C), and black (K). Electrostatic latent images corresponding to images in mutually different colors are formed on the four photosensitive members.

The imager 228 transfers a toner image formed on the photosensitive member onto the sheet. The imager 228 includes a developing device, a transfer unit, and a toner replenisher. The developing device forms a toner image by causing toner charged to a negative polarity to adhere from a developing cylinder to an electrostatic latent image formed on the surface of the photosensitive member. Four developing devices are provided in correspondence with the four colors of yellow (Y), magenta (M), cyan (C), and black (K). The developing device visualizes the electrostatic latent image on the photosensitive member through use of the toner of the corresponding color. When an amount of toner inside the developing device is insufficient due to the formation of the toner image, the developing device is replenished with toner by the toner replenisher.

The transfer unit includes an intermediate transfer belt, and transfers the toner image from each of the photosensitive members onto the intermediate transfer belt. A primary transfer roller is provided at a position opposed to each photosensitive member across the intermediate transfer belt. When a positive potential is applied to each primary transfer roller, the toner images are transferred from the four photosensitive members onto the intermediate transfer belt while being superimposed on one another. Thus, a full-color toner image is formed on the intermediate transfer belt. The toner image formed on the intermediate transfer belt is transferred onto the sheet by a secondary transfer roller described later. The secondary transfer roller transfers the full-color toner image from the intermediate transfer belt onto the sheet when a positive potential is applied to the secondary transfer roller.

The fixer 229 fixes the transferred toner image to the sheet. The fixer 229 includes a heater and a roller pair. The fixer 229 heats and pressurizes the toner image on the sheet by the heater and the roller pair to melt the toner image and fix the toner image to the sheet. Thus, the image is formed on the sheet. The sheet feeder 230 includes a conveyance roller and various sensors in a conveyance path, and controls a sheet feeding operation.

The image reader 231 reads the image formed on the conveyed sheet based on an instruction received from the CPU 222. For example, in a case of adjusting image forming conditions, the CPU 222 causes the image reader 231 to read images for adjustment of the image forming conditions, which are formed on the sheet. The on-belt reader 232 reads the image formed on the intermediate transfer belt of the transfer unit based on the instruction received from the CPU 222. For example, in the case of adjusting the image forming conditions, the CPU 222 causes the on-belt reader 232 to read the images for adjustment of the image forming conditions, which are formed on the intermediate transfer belt.

The operating device 224 is an input device which receives input of various settings and operation instructions from the user. Examples of the operating device 224 include various input keys and a touch panel. The display 225 is an output device which displays setting information on the image forming apparatus 101 and a processing status (status information) of the print job.

Finisher

The finisher 109 is, for example, a large-capacity stacker. The finisher 109 includes a communication I/F 241, a CPU 242, a memory 243, a sheet delivery controller 244, and a cut-off controller 245. Those components are connected to one another through a system bus 246 so as to enable communication to/from one another. The communication I/F 241 is connected to the printing apparatus 107 through the communication cable 249, and controls communication to/from the printing apparatus 107. When the finisher 109 and the printing apparatus 107 operate in cooperation with each other, information and data are transmitted and received through intermediation of the communication I/F 241. The CPU 242 executes control programs stored in the memory 243 to perform various kinds of control required for sheet delivery. The memory 243 stores the control programs. The memory 243 provides a work area for the CPU 242 to execute various kinds of processing. The sheet delivery controller 244 delivers the conveyed sheet onto the stack tray 332 based on an instruction received from the CPU 242. The cut-off controller 245 controls an operation of a cut-off mechanism which cuts off the margin area in the outer edge portion of the sheet based on the instruction received from the CPU 242.

External Controller

The external controller 102 includes a LAN I/F 213, a LAN I/F 214, and a video I/F 215 in order to communicate to/from other apparatus. The external controller 102 includes a CPU 208, a memory 209, and a storage 210 in order to control the operation of the external controller 102. The external controller 102 includes a keyboard 211 and a display 212 as user interfaces. Those components are connected to one another through a system bus 216 so as to enable communication to/from one another.

The LAN I/F 213 is connected to the client PC 103 through the external LAN 104, and controls communication to/from the client PC 103. The external controller 102 obtains the print job from the client PC 103 through intermediation of the LAN I/F 213. The LAN I/F 214 is connected to the printing apparatus 107 through the internal LAN 105, and controls communication to/from the printing apparatus 107. The external controller 102 transmits, for example, the print setting and the image data to the printing apparatus 107 through intermediation of the LAN I/F 214. The video I/F 215 is connected to the printing apparatus 107 through the video cable 106, and controls communication to/from the printing apparatus 107. The external controller 102 transmits the image data to the printing apparatus 107 through intermediation of the video I/F 215.

The CPU 208 executes computer programs stored in the storage 210 to comprehensively perform processing, such as reception of the image data transmitted from the client PC 103, RIP processing, and transmission of the image data to the image forming apparatus 101. The memory 209 provides a work area for the CPU 208 to execute various kinds of processing. The keyboard 211 is an input device which receives input of various settings and operation instructions from the user. The display 212 is an output device which displays information on an execution application of the external controller 102 as a still image or a moving image.

Client PC

The client PC 103 includes a CPU 201, a memory 202, a storage 203, a keyboard 204, a display 205, and a LAN I/F 206. Those components are connected to one another through a system bus 207 so as to enable communication to/from one another.

The CPU 201 executes computer programs stored in the storage 203 to control the operation of the client PC 103. In this embodiment, the CPU 201 creates image data and transmits a print job. The memory 202 provides a work area for the CPU 201 to execute various kinds of processing. The keyboard 204 and the display 205 are user interfaces. The keyboard 204 is an input device which receives instructions from the user. The display 205 is an output device which displays information on an execution application of the client PC 103 as a still image or a moving image. The LAN I/F 206 is connected to the external controller 102 through the external LAN 104, and controls communication to/from the external controller 102. The client PC 103 transmits the print job to the external controller 102 through the LAN I/F 206.

The external controller 102 and the image forming apparatus 101 are connected through the internal LAN 105 and the video cable 106, but may be connected, for example, only through a video cable as long as data required for printing can be transmitted and received therebetween. It suffices that each of the memory 202, the memory 209, the memory 223, and the memory 243 is a storage device for holding data and programs. As those memories, it is possible to use, for example, a volatile random access memory (RAM), a non-volatile read only memory (ROM), a storage, and a universal serial bus (USB) memory.

<Configuration of Image Forming Apparatus>

Figure 3:
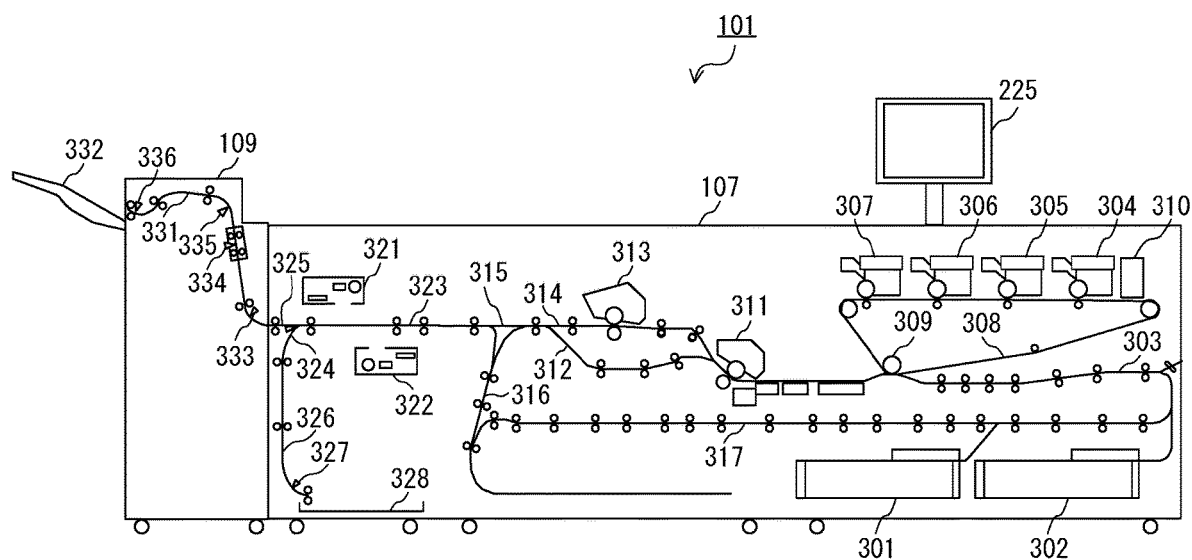
FIG. 3 is a configuration diagram of an image forming apparatus.

FIG. 3 is a configuration diagram of the image forming apparatus 101. The display 225 is provided at an upper part of a casing of the printing apparatus 107. The display 225 displays information for a printing status and settings of the image forming apparatus 101. The sheet having the image formed thereon by the printing apparatus 107 is conveyed to the finisher 109 provided in the subsequent stage.

The printing apparatus 107 includes, as the sheet feeder 230, a plurality of sheet feeding decks 301 and 302, conveyance paths 303, 312, 314, 315, and 323, a reverse path 316, a double-sided conveyance path 317, a downstream conveyance path 325, a delivery path 326, and various rollers. Mutually different types of sheets can be stored in the sheet feeding decks 301 and 302. Of the sheets stored in the sheet feeding decks 301 and 302, an uppermost sheet is separated and fed to the conveyance path 303. The printing apparatus 107 includes, as the exposure device 227, image forming units 304, 305, 306, and 307 for forming an image. The printing apparatus 107 forms a color image. To that end, the image forming unit 304 forms a black (K) image (toner image). The image forming unit 305 forms a cyan (C) image (toner image). The image forming unit 306 forms a magenta (M) image (toner image). The image forming unit 307 forms a yellow (Y) image (toner image).

The printing apparatus 107 includes, as the imager 228, a secondary transfer roller 309 and an intermediate transfer belt 308 onto which the toner images are to be transferred from the image forming units 304, 305, 306, and 307. The intermediate transfer belt 308 is rotated clockwise in FIG. 3, and the toner images are superimposed on one another and transferred in the order of the image forming unit 307, the image forming unit 306, the image forming unit 305, and the image forming unit 304 (primary transfer). Thus, a full-color toner image is formed on the intermediate transfer belt 308.

The intermediate transfer belt 308 is rotated, to thereby carry the toner image to the secondary transfer roller 309. The sheet is conveyed to the conveyance path 303 at a timing at which the toner image is carried to the secondary transfer roller 309. The secondary transfer roller 309 transfers the toner image on the intermediate transfer belt 308 onto the conveyed sheet (secondary transfer).

In the vicinity of the intermediate transfer belt 308, an on-belt reading sensor 310 is provided as the on-belt reader 232. The on-belt reading sensor 310 is located downstream of the image forming units 304, 305, 306, and 307 in the rotation direction of the intermediate transfer belt 308. The on-belt reading sensor 310 reads an image (toner image) transferred from the image forming units 304, 305, 306, and 307 onto the intermediate transfer belt 308. The on-belt reading sensor 310 is, for example, an optical sensor. The on-belt reading sensor 310 irradiates an image (toner image) on the intermediate transfer belt 308 with light, and receives the reflected light, to thereby read an image (toner image). For example, the on-belt reading sensor 310 reads the images for adjustment for adjusting the image forming conditions, which are formed on the intermediate transfer belt 308. The CPU 222 analyzes results of reading the images for adjustment by the on-belt reading sensor 310, and feeds back the analyzed results to the image forming conditions to perform calibration.

The printing apparatus 107 includes, as the fixer 229, a first fixing device 311 and a second fixing device 313. The first fixing device 311 and the second fixing device 313 have the same configuration, and are each fix the toner image to the sheet. To that end, the first fixing device 311 and the second fixing device 313 each include a pressure roller and a heating roller. The sheet is heated and pressurized by passing between the pressure roller and the heating roller to have the toner image melted and press-fixed. The sheet that has passed through the second fixing device 313 is conveyed to the conveyance path 314. The second fixing device 313 is arranged downstream of the first fixing device 311 in a sheet conveying direction, and is used for adding a gloss to the image on the sheet, which has been subjected to fixing processing by the first fixing device 311, and for ensuring fixability. For that reason, the second fixing device 313 may not be used depending on the type of sheet and the content of the print job. The conveyance path 312 is provided in order to convey the sheet subjected to the fixing processing by the first fixing device 311 without passing the sheet through the second fixing device 313.

At a position after the conveyance path 314 and the conveyance path 312 merge, the conveyance path 315 and the reverse path 316 are provided. When duplex printing is instructed, the sheet is conveyed to the reverse path 316. The sheet conveyed to the reverse path 316 is reversed in the reverse path 316 in terms of the conveying direction, and conveyed to the double-sided conveyance path 317. A surface (first surface) of the sheet on which an image has been formed is reversed by the reverse path 316 and the double-sided conveyance path 317. The sheet is conveyed to the conveyance path 303 by the double-sided conveyance path 317, and passes through the secondary transfer roller 309 and the fixer 229, to thereby have an image formed on a second surface of the sheet.

In a case of single-sided printing or when images are formed on both sides by duplex printing, the sheet is conveyed to the conveyance path 315. A conveyance path 323 is arranged downstream of the conveyance path 315 in the sheet conveying direction.

Figure 4:
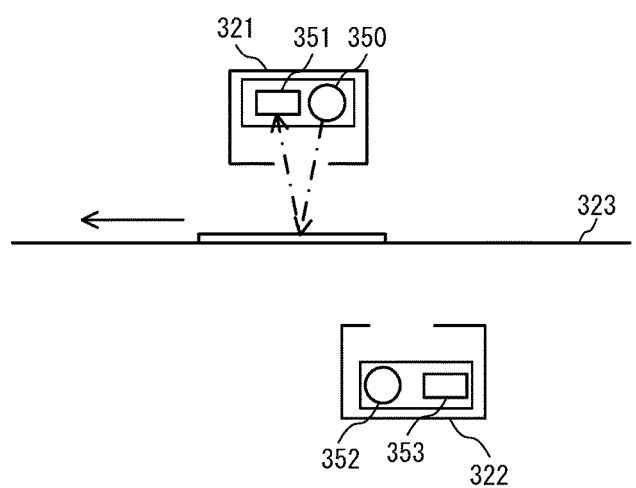
FIG. 4 is an explanatory view of CISs.

As the image reader 231, contact image sensors (CISs) 321 and 322 are arranged in the conveyance path 323 so as to be opposed to each other across the conveyance path 323. FIG. 4 is an explanatory view of the CISs 321 and 322. The CIS 321 is an optical sensor which reads an image on an upper surface of the sheet being conveyed along the conveyance path 323. The CIS 322 is an optical sensor which reads an image on a lower surface of the sheet being conveyed along the conveyance path 323.

The CIS 321 includes a light emitting diode (LED) 350 serving as a light source and a reading sensor 351 serving as a light receiver. The LED 350 irradiates the upper surface of the sheet with light at a timing at which the sheet conveyed along the conveyance path 323 reaches a reading position. The reading sensor 351 includes a plurality of light-receiving elements (photoelectric conversion elements) in a direction perpendicular to the sheet conveying direction. Therefore, the direction perpendicular to the sheet conveying direction is a main scanning direction of the CIS 321. The reading sensor 351 receives the light reflected by the sheet through the light-receiving elements. The plurality of light-receiving elements of the reading sensor 351 each output an output value (electric signal) based on intensity of the reflected light that has been received. Each output value (electric signal) output from the plurality of light-receiving elements is transmitted to the CPU 222. In this manner, an image formed on the sheet is read.

The CIS 322 includes an LED 352 and a reading sensor 353 having the same configurations as those of the CIS 321. The CIS 322 operates in the same manner as the CIS 321 to read an image formed on the lower surface of the sheet at a timing at which the sheet conveyed along the conveyance path 323 reaches a reading position. In addition to the CISs 321 and 322, the image reader 231 can also be implemented by a CCD or CMOS sensor.

The printing apparatus 107 in this embodiment can form images for adjustment for adjusting the image forming conditions on both sides of the sheet. A sheet having the images for adjustment formed thereon is referred to as "chart for adjustment." The printing apparatus 107 prints, together with the user image corresponding to the print job, the images for adjustment on a sheet to create a chart for adjustment, and causes the CIS 321 and the CIS 322 to read the images for adjustment. Results of reading the chart for adjustment by the CIS 321 and the CIS 322 are stored in the memory 223. The CPU 222 refers to the memory 223 to analyze the results of reading the chart for adjustment by the CIS 321 and the CIS 322, and feeds back the analyzed results to the image forming conditions to perform calibration.

The image for adjustment is, for example, an image for detecting image density, an image for detecting geometric characteristics of an image, or an image for detecting color misregistration. In this embodiment, the image for adjustment for detecting the image density of an image printed on the sheet is described. The geometric characteristics of the image refer to, for example, squareness and a printing position of the image on the sheet. When the image for adjustment for detecting the geometric characteristics of the image is formed, the CPU 222 performs calibration in order to suppress variations in the geometric characteristics based on the reading results obtained by the on-belt reading sensor 310 and the CIS 321 (or CIS 322). The CPU 222 controls, for example, a light emission timing of the light source of the exposure device 227 based on the image forming conditions subjected to the calibration, to thereby adjust the geometric characteristics of the image to ideal geometric characteristics.

Further, when an image for adjustment for detecting the color misregistration is formed, the CPU 222 detects the color misregistration based on the reading results obtained by the on-belt reading sensor 310 and the CIS 321 (or the CIS 322). The CPU 222 performs calibration based on the detected color misregistration in order to suppress the color misregistration. The CPU 222 controls, based on the image forming conditions subjected to the calibration, a position of an image to be formed on each photosensitive member by the exposure device 227, to thereby correct the color misregistration.

The user image is not printed on the chart for adjustment in some cases. A sheet on which not the user image but only the image for adjustment is printed is excluded so as not to be mixed in the sheets on which the user images are printed. To that end, the printing apparatus 107 includes a flapper 324, the delivery path 326, a conveyance sensor 327, and a delivery tray 328. The chart for adjustment on which only the image for adjustment is printed and which has the image for adjustment read by the CISs 321 and 322 is conveyed to the delivery path 326 by the flapper 324. The sheet conveyed to the delivery path 326 is delivered to the delivery tray 328.

The sheet on which the user image is printed is conveyed from the conveyance path 323 to the downstream conveyance path 325 by the flapper 324. A printed matter conveyed to the downstream conveyance path 325 is passed over to the finisher 109. When the printing apparatus 107 obtains a notification of occurrence of a conveyance jam from the finisher 109, irrespective of whether or not the user image is printed, the printing apparatus 107 switches the flapper 324 toward the delivery path 326 to deliver all the sheets in the machine (residual sheets) to the delivery tray 328. The delivery of the residual sheets to the delivery tray 328 reduces a load on the user in jam clearance.

The finisher 109 can stack the printed matters passed over from the printing apparatus 107. The finisher 109 includes a conveyance path 331 and the stack tray 332 for stacking the printed matters. In addition, the finisher 109 includes a cut-off mechanism (not shown), and cuts off the margin area in which the image for adjustment is printed from the sheets passed over from the printing apparatus 107. With the margin area having been cut off, the sheet becomes a printed matter on which only the user image is printed. Such printed matters are stacked onto the stack tray 332. When the image for adjustment is not printed, the sheet is not subjected to the cut-off, and is stacked onto the stack tray 332. The conveyance path 331 is provided with conveyance sensors 333, 334, 335, and 336. The printed matters conveyed from the printing apparatus 107 are stacked on the stack tray 332 through the conveyance path 331. The conveyance sensors 333, 334, 335, and 336 each detect passage of the printed matter being conveyed along the conveyance path 331. When a leading edge or a trailing edge of the printed matter in the conveying direction is not detected by the conveyance sensors 333, 334, 335, and 336 even after a lapse of a predetermined time period since start of the conveyance of the printed matter, the CPU 242 determines that a conveyance jam (conveyance abnormality) has occurred in the finisher 109. In this case, the CPU 242 notifies the printing apparatus 107 that a conveyance jam has occurred.

<Images for Adjustment>

Figure 5A:
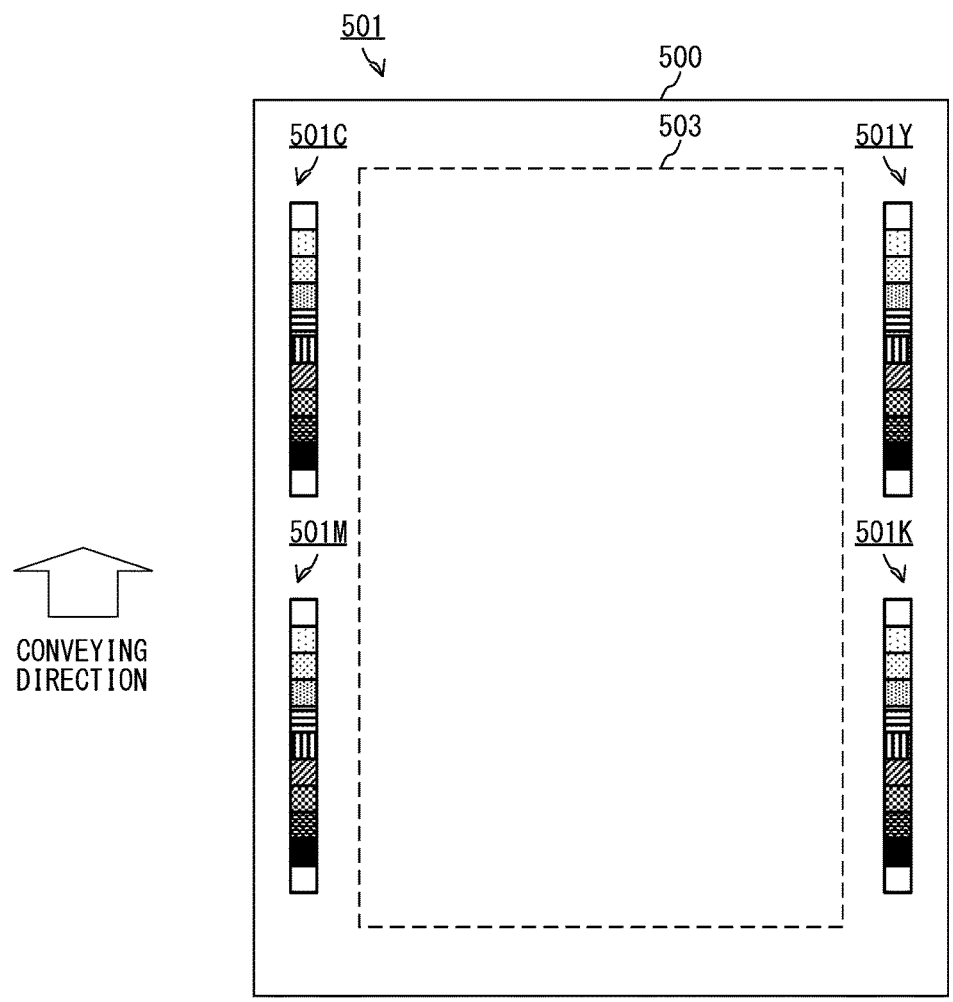
FIG. 5A and FIG. 5B are exemplary views of images for adjustment.
Figure 5B:
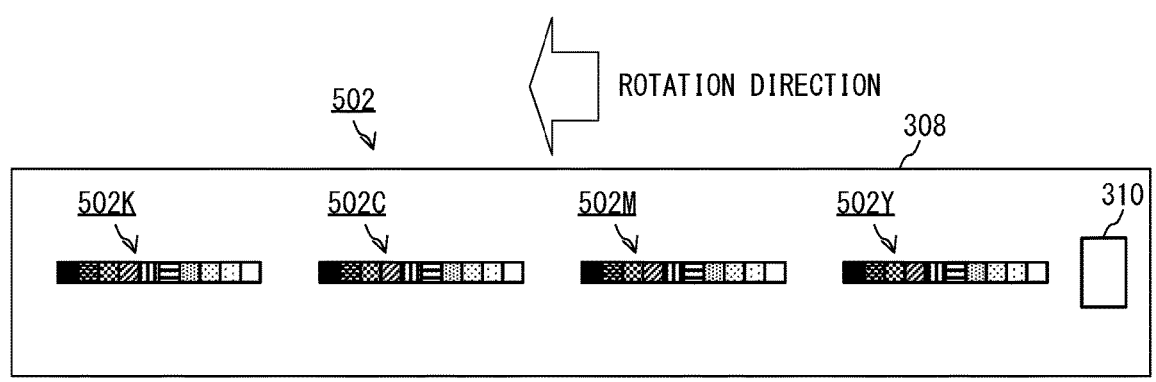

FIG. 5A and FIG. 5B are exemplary views of the images for adjustment for detecting the image density. In FIG. 5A, a chart 500 for adjustment in which images 501 for adjustment are formed on the sheet is illustrated as an example. In FIG. 5B, images 502 for adjustment borne on the intermediate transfer belt 308 are illustrated as an example. The sheet is provided with an area 503 in which the user image is to be printed, and the images 501 for adjustment are formed in the margin area around the area 503.

The conveying direction illustrated in FIG. 5A indicates a direction in which the chart 500 for adjustment is conveyed along the conveyance path 323. The images 501 for adjustment are images for adjustment for image density correction, and are formed on one surface of the sheet for respective colors. The images 501 for adjustment may be formed at any positions in a peripheral edge portion around the area 503 in which the user image is to be formed. In this embodiment, the images 501 for adjustment are formed in both end portions of the sheet in a direction (short-side direction of the sheet) perpendicular to the sheet conveying direction. That is, the images 501 for adjustment of two colors are formed in one end portion of the sheet in the short-side direction, and the images 501 for adjustment of the remaining two colors are formed in the other end portion of the sheet in the short-side direction. In this embodiment, images 501C and 501M for adjustment of cyan and magenta are formed in one end portion of the sheet in the short-side direction, and images 501Y and 501K for adjustment of yellow and black are formed in the other end portion of the sheet in the short-side direction. Thus, the images 501 for adjustment are not formed in a leading edge portion of the sheet in the conveying direction, and it is possible to more reliably suppress occurrence of winding of the sheet during the fixing processing.

The images 501 for adjustment are each formed of a plurality of tone patches (11 tones in FIG. 5A) in which a tone value of each color is varied stepwise. The plurality of tone patches are each, for example, a square shape having a side of about 8 mm, and are arranged in a row in the conveying direction. In the tone patches of each color, a tone patch for detecting a texture of the sheet (that is, a tone patch having a tone value of 0) is located at each of both ends of a row of the other tone patches. Nine tone patches having evenly distributed tone values are arranged so as to be sandwiched between the tone patches having a tone value of 0. When the tone value is represented by a range of from 0 to 255, the images 501 for adjustment are each formed of the tone patches of each color having tone values of 0, 16, 32, 64, 86, 104, 128, 176, 224, 255, and 0. The images 501 for adjustment are not limited to yellow, magenta, cyan, and black, and may be formed of respective colors of red, green, and blue and process black. The size and the tone order are not limited as well.

The images 502 for adjustment on the intermediate transfer belt 308 of FIG. 5B are each formed at such a position as to pass through a reading position of the on-belt reading sensor 310 by the rotation of the intermediate transfer belt 308. The intermediate transfer belt 308 bears the images 502 for adjustment as the image bearing member, and is rotated so that the images 502 for adjustment each pass through the reading position of the on-belt reading sensor 310. Images 502Y, 502M, 502C, and 502K for adjustment of the respective colors are linearly arranged in the rotation direction of the intermediate transfer belt 308. The images 502Y, 502M, 502C, and 502K for adjustment are each formed of a plurality of tone patches (10 tones in FIG. 5B) in which each tone value is varied stepwise. The plurality of tone patches are each, for example, a square shape having a side of about 10 mm, and are arranged in a row in the rotation direction of the intermediate transfer belt 308.

In the tone patches of each color, a tone patch for detecting a texture of the intermediate transfer belt 308 (that is, a tone patch having a tone value of 0) is located in one end portion of a row of the tone patches. Nine tone patches having evenly distributed tone values are arranged so as to follow the tone patch having a tone value of 0. When the tone value is represented by a range of from 0 to 255, the images 502 for adjustment are each formed of the tone patches of each color having tone values of 0, 16, 32, 64, 86, 104, 128, 176, 224, and 255. The images 502 for adjustment are not limited to yellow, magenta, cyan, and black, and may be formed of respective colors of red, green, and blue and process black. The size and the tone order are not limited as well. When a plurality of on-belt reading sensors 310 are provided along a direction perpendicular to the rotation direction of the intermediate transfer belt 308, a plurality of images 502 for adjustment may also be arranged at the reading positions of the respective on-belt reading sensors 310.

<Feedback Control>

Figure 6:
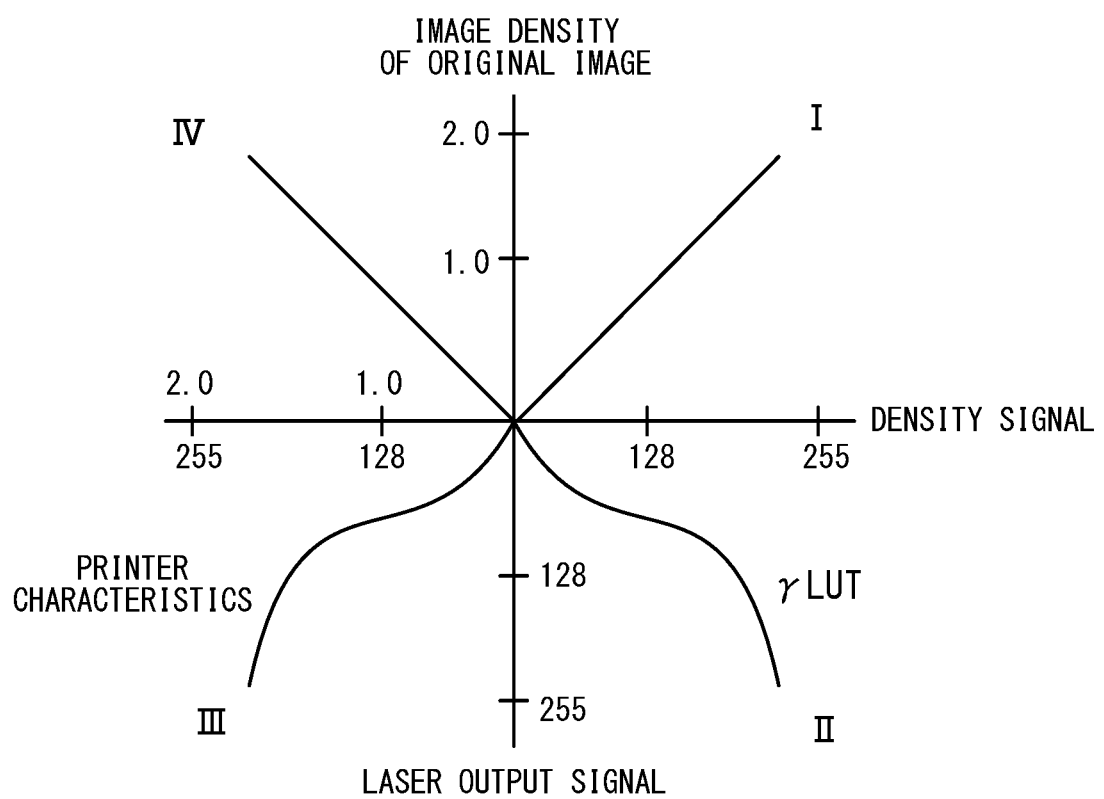
FIG. 6 is a four-quadrant chart for showing how tones are reproduced.

FIG. 6 is a four-quadrant chart for showing how the tones are reproduced. Quadrant I represents a relationship between the density of an image (original image) to be printed and an input value of image data (density signal) indicating the image. Quadrant II represents a conversion condition (γLUT) for converting the density signal into a laser output signal indicating an amount of laser light output from the exposure device 227. Quadrant III represents tone characteristics (printer characteristics) of the printing apparatus 107 indicating a relationship between the laser output signal and the density (image density) of the image formed on the sheet. Quadrant IV indicates a relationship between the density of the original image and the density (image density) of the image formed on the sheet. That is, the four-quadrant chart represents total tone reproduction characteristics of the printing apparatus 107 illustrated in FIG. 1.

FIG. 6 is an illustration of a case in which processing is performed based on an 8-bit digital signal and the number of tones is indicated as 256 tones. The printing apparatus 107 generates a conversion condition (γLUT) in quadrant II so that the density of the original image and the image density have an ideal relationship (linear relationship). When a γLUT is generated based on the reading results obtained by the reading sensors 351 and 353, the CPU 222 obtains tone characteristics from the reading results of the images 501 for adjustment, and generates a γLUT so that the tone characteristics become ideal tone characteristics. Meanwhile, when a γLUT is generated based on the reading result obtained by the on-belt reading sensor 310, the CPU 222 obtains tone characteristics from the reading results of the images 502 for adjustment, and generates a γLUT so that the tone characteristics become ideal tone characteristics. An image signal having the tone characteristics converted by the γLUT is converted into a pulse signal corresponding to a dot width by a pulse width modulation (PWM) circuit of a laser driver, and is transmitted to the laser driver for driving and controlling the exposure device 227. In this embodiment, a tone reproduction method based on pulse width modulation is used for all the colors of yellow, magenta, cyan, and black. The γLUT is an example of the image forming condition to be controlled in order to adjust the image density.

The laser light output from the exposure device 227 is scanned, to thereby form, on the photosensitive drum, an electrostatic latent image having the tones controlled by changing the dot area to have predetermined tone characteristics. This electrostatic latent image is developed into a toner image, and the toner image is transferred onto a sheet and fixed to the sheet, to thereby reproduce a tone image.

In regard to a halftone image, which is not a solid image having an image density of 100%, correction is performed through use of a feedback rate for the γLUT. When the reading result of the solid image indicates an image density higher than a target density, the γLUT is corrected so that the image density is lowered. That is, when the image density of the formed image is higher than a predetermined image density due to the intensity of predetermined laser light, an exposure time of the laser light is set shorter. However, when the exposure time is shortened, jaggies may occur in an image including characters and thin lines, and the image quality may deteriorate. Therefore, the solid image is adjusted by changing a set value of the intensity of the laser light so as to avoid excessive shortening of the exposure time. The intensity of the laser light is an example of the image forming condition to be controlled in order to adjust the image density.

The tone characteristics in quadrant IV are linearly corrected based on the reading results of the images 502 for adjustment formed on the intermediate transfer belt 308, to thereby correct the printer characteristics to be applied until the primary transfer. The tone characteristics in quadrant IV are linearly corrected based on the reading results of the images 501 for adjustment on the chart 500 for adjustment, to thereby correct the image density to be applied after the secondary transfer and the fixing processing.

<Printing Processing>

Figure 7:
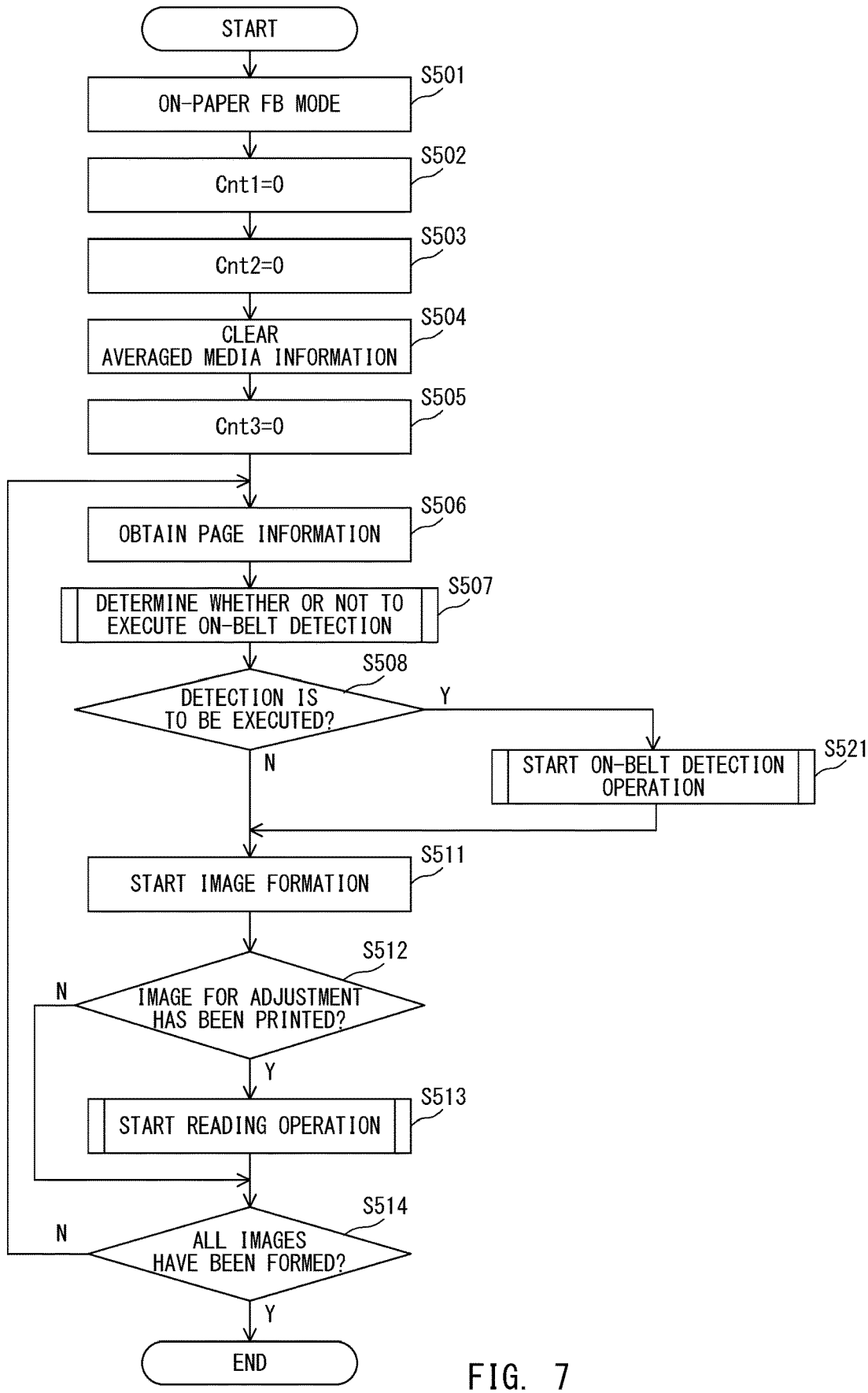
FIG. 7 is a flow chart for illustrating printing processing.

FIG. 7 is a flow chart for illustrating printing processing in this embodiment. In the printing processing, the processing is branched off depending on a feedback control operation mode (hereinafter referred to as "FB mode") for adjusting the image forming conditions. The FB mode includes an "on-paper FB mode" and an "on-belt FB mode." In the "on-paper FB mode," calibration is performed based on the reading results of the images 501 for adjustment on the chart 500 for adjustment. In the "on-belt FB mode," calibration is performed based on the reading results of the images 502 for adjustment on the intermediate transfer belt 308. The setting of the FB mode is referred to when the chart 500 for adjustment is created. Even after the chart 500 for adjustment has been created, when the FB mode is set to the on-belt FB mode, an operation based on the on-belt FB mode is performed.

In response to an instruction to perform the printing operation, the CPU 222 sets the on-paper FB mode as the FB mode (Step S501). The CPU 222 sets an on-paper FB non-execution counter value Cnt1 to "0" (Step S502). The on-paper FB non-execution counter value Cnt1 is a variable for counting the number of times that the images 501 for adjustment on the chart 500 for adjustment have been read but no feedback to the image forming conditions has been performed. The CPU 222 sets a number-of-read-sheets counter value Cnt2 to "0" (Step S503). The number-of-read-sheets counter value Cnt2 is a variable for counting the number of times that the images 501 for adjustment on the chart 500 for adjustment have been read. In this embodiment, when the number-of-read-sheets counter value Cnt2 reaches a predetermined number, the CPU 222 updates the image forming conditions based on a result of averaging the predetermined number of reading results of the predetermined number of sets of images 501 for adjustment at that time point. It is assumed herein that the predetermined number is, for example, "5."

The CPU 222 clears averaged media information recorded in the memory 223 (Step S504). In this embodiment, the reading results of the images 501 for adjustment on the chart 500 for adjustment are averaged, and the image forming conditions are updated. At this time, the images 501 for adjustment, which have been formed on sheets of the same type, are read, thereby being capable of suppressing reading variations. To that end, it is required to hold information including the paper width, paper length, basis weight, and paper type of the sheet used as the chart 500 for adjustment as information (averaged media information) on the sheet being subjected to averaging. When the held averaged media information (paper width, paper length, basis weight, and paper type) and the information (paper width, paper length, basis weight, and paper type) on a target sheet to be read match, it is determined that the averaging processing is possible.

The CPU 222 sets an on-belt detection execution counter value Cnt3 to "0" (Step S505). The on-belt detection execution counter value Cnt3 is a variable for determining whether or not a timing to execute the reading of the images 502 for adjustment on the intermediate transfer belt 308 has been reached. In this embodiment, when the on-belt detection execution counter value Cnt3 reaches a threshold value C, the CPU 222 forms the images 502 for adjustment on the intermediate transfer belt 308, and updates the image forming conditions based on the reading results of the images 502 for adjustment.

The CPU 222 obtains page information (Step S506). In this embodiment, the page information is stored in a queue of the memory 223 so that the order of respective pages of images to be printed can be grasped. The CPU 222 performs, for example, sheet conveyance control based on the page information. The page information in this embodiment includes not only information of the page ID, paper width, paper length, basis weight, paper type, and sheet feeding stage ID of a page to be printed but also image-for-adjustment printing information indicating information of whether or not to print an image for adjustment on the page to be printed. The image-for-adjustment printing information is, for example, user instruction information to be output when the user performs setting relating to calibration through use of the client PC 103.

The CPU 222 determines, based on the page information and the set value of the FB mode, whether or not to execute on-belt detection for adjusting the image forming conditions based on the reading results of the images 502 for adjustment on the intermediate transfer belt 308 (Step S507). Details of processing for determining whether or not to execute the on-belt detection are described later. When the determination results in that the on-belt detection is to be executed (Y in Step S508), the CPU 222 starts an on-belt detection operation (Step S521). Details of the on-belt detection operation are described later. After the on-belt detection operation, the CPU 222 starts image formation (printing) of the user image based on the page information (Step S511). When it is determined that the on-belt detection is not to be executed (N in Step S508), the CPU 222 skips the on-belt detection operation to start image formation (printing) of the user image and the images 501 for adjustment based on the page information (Step S511).

The CPU 222 determines whether or not an image for adjustment has been printed on the page to be printed based on the image-for-adjustment printing information of the page information (Step S512). When an image for adjustment has been printed (Y in Step S512), the CPU 222 starts a reading operation for reading the image for adjustment from the sheet (Step S513). Reading operation processing for the image for adjustment is performed in parallel with the printing processing. Details of the reading operation for the image for adjustment are described later.

When an image for adjustment has not been printed (N in Step S512), or after the reading operation for the image for adjustment is started, the CPU 222 determines whether or not all images included in a print job have been formed (Step S514). When not all the images included in the print job have been formed (N in Step S514), the CPU 222 advances the process to Step S506. Thus, the CPU 222 repeatedly performs the processing steps of from Step S506 to Step S514 until all the images included in the print job have been formed. When all the images included in the print job have been formed (Y in Step S514), the CPU 222 ends the printing processing. The sheet on which the image for adjustment has been printed is delivered onto the stack tray 332 after a margin part of the sheet is cut off by the finisher 109.

Figure 8:
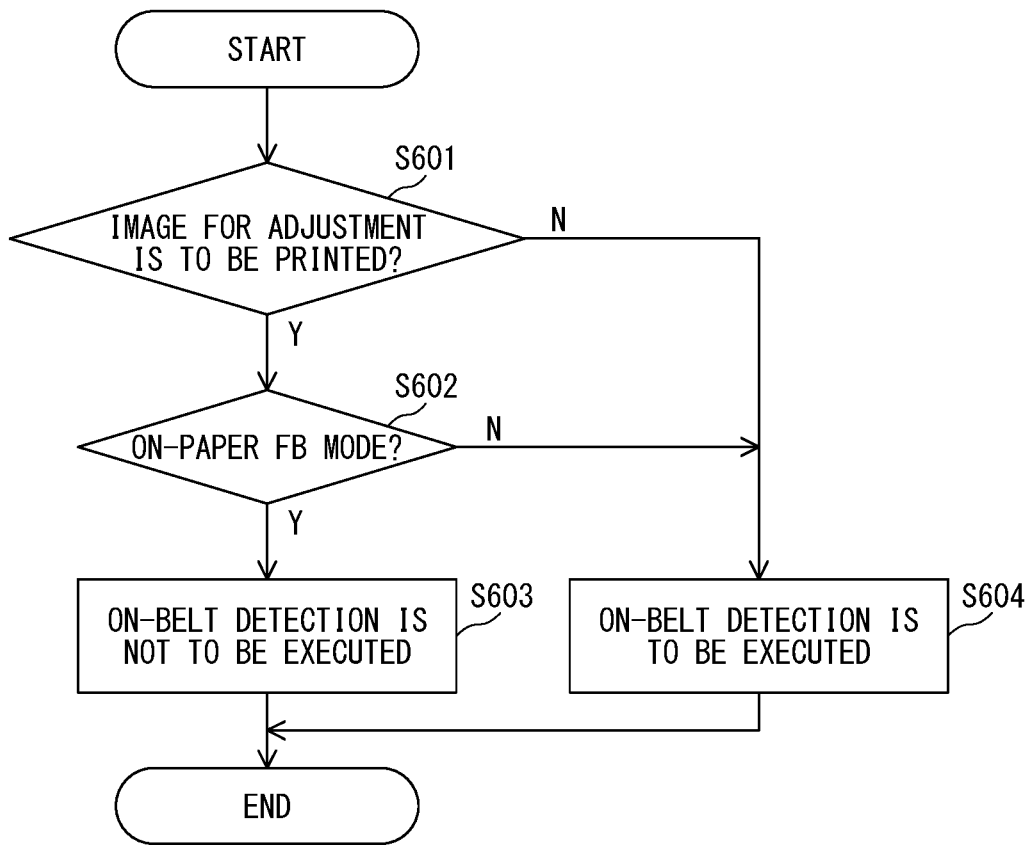
FIG. 8 is a flow chart for illustrating processing for determining whether or not to execute on-belt detection.

FIG. 8 is a flow chart for illustrating the processing for determining in Step S507 whether or not to execute the on-belt detection. The CPU 222 determines whether or not the printing of the image for adjustment on the page to be printed is set to be performed based on the image-for-adjustment printing information of the page information obtained in the processing step of Step S506 (Step S601). When the printing of the image for adjustment is set to be performed (Y in Step S601), the CPU 222 determines whether or not the FB mode is set to the on-paper FB mode (Step S602).

When the FB mode is set to the on-paper FB mode (Y in Step S602), the CPU 222 determines that the on-belt detection is not to be executed (Step S603), and ends the processing. When the printing of the image for adjustment is not set to be performed (N in Step S601), or when the FB mode is not set to the on-paper FB mode (N in Step S602), the CPU 222 determines that the on-belt detection is to be executed (Step S604), and ends the processing.

Figure 9:
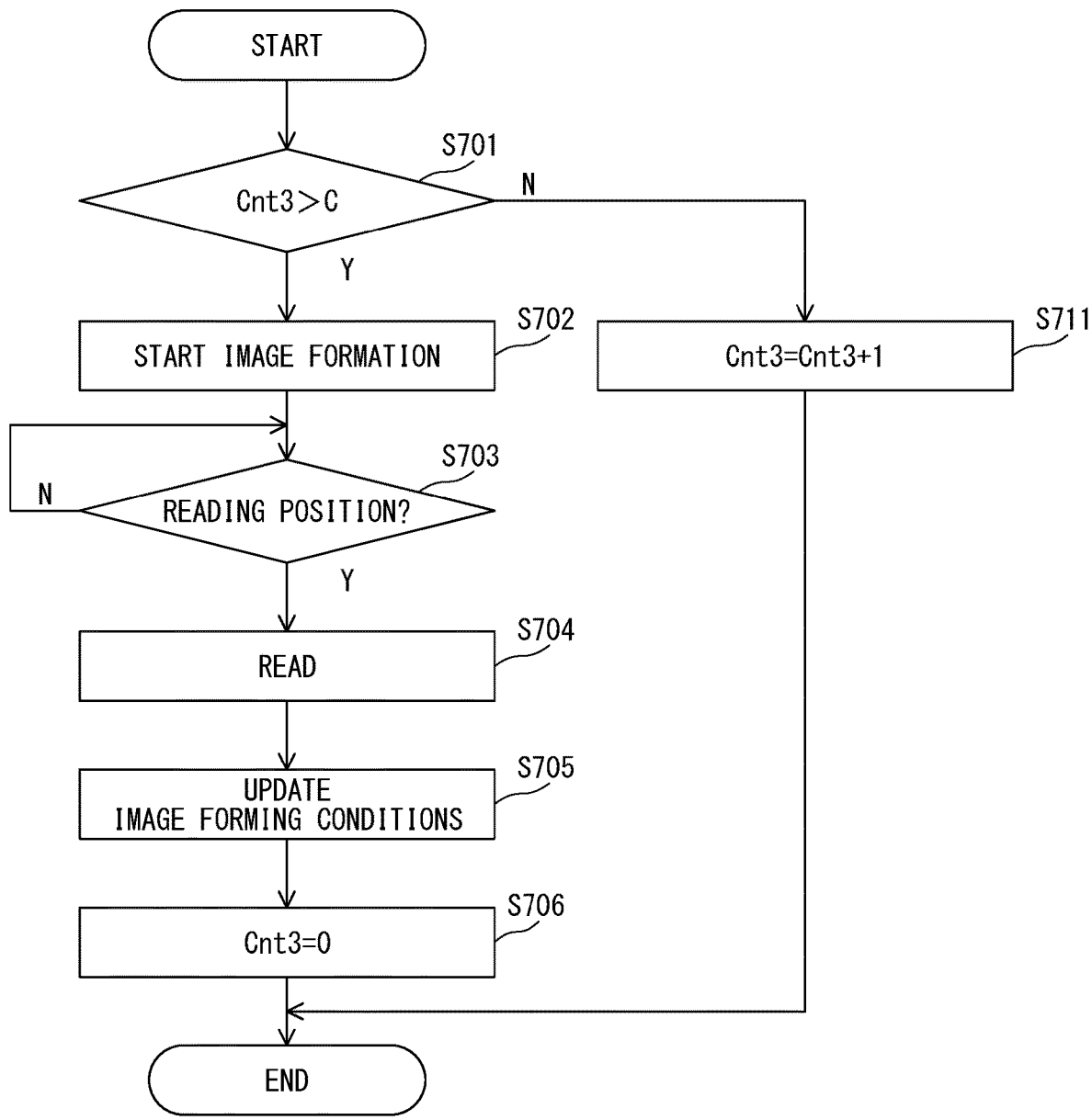
FIG. 9 is a flow chart for illustrating an on-belt detection operation.

FIG. 9 is a flow chart for illustrating the on-belt detection operation of Step S521.

The CPU 222 determines whether or not the on-belt detection execution counter value Cnt3 exceeds the threshold value C (Step S701). This threshold value C is the threshold value C for determining whether or not the adjustment of the image forming conditions based on the images 502 for adjustment formed on the intermediate transfer belt 308 is to be executed at predetermined intervals. When the on-belt detection execution counter value Cnt3 does not exceed the threshold value C (N in Step S701), the CPU 222 adds "1" to the on-belt detection execution counter value Cnt3 (Step S711), and ends the processing. That is, when the on-belt detection execution counter value Cnt3 exceeds the threshold value C, it is determined in the processing step of Step S508 that the on-belt detection is to be executed, and when the on-belt detection execution counter value Cnt3 does not exceed the threshold value C, "1" is added to the on-belt detection execution counter value Cnt3. The CPU 222 determines whether or not the on-belt detection execution counter value Cnt3 exceeds the threshold value C each time an image corresponding to one page is formed. It is assumed herein that the threshold value C is, for example, "25."

When the on-belt detection execution counter value Cnt3 exceeds the threshold value C (Y in Step S701), the CPU 222 starts to form the images 502 for adjustment on the intermediate transfer belt 308 (Step S702). The CPU 222 stands by until the images 502 for adjustment reach the reading position of the on-belt reading sensor 310 (N in Step S703). When the images 502 for adjustment reach the reading position of the on-belt reading sensor 310 (Y in Step S703), the CPU 222 reads the images 502 for adjustment by the on-belt reading sensor 310 (Step S704). The CPU 222 updates the image forming conditions held in the memory 223 to image forming conditions generated based on the reading results of the images 502 for adjustment (Step S705). The CPU 222 sets the on-belt detection execution counter value Cnt3 to "0" (Step S706), and ends the processing. The on-belt detection execution counter value Cnt3 is set to "0" when the on-belt detection operation is executed during the printing processing. In this manner, the on-belt detection operation is performed each time the on-belt detection execution counter value Cnt3 exceeds the threshold value C.

Figure 10:
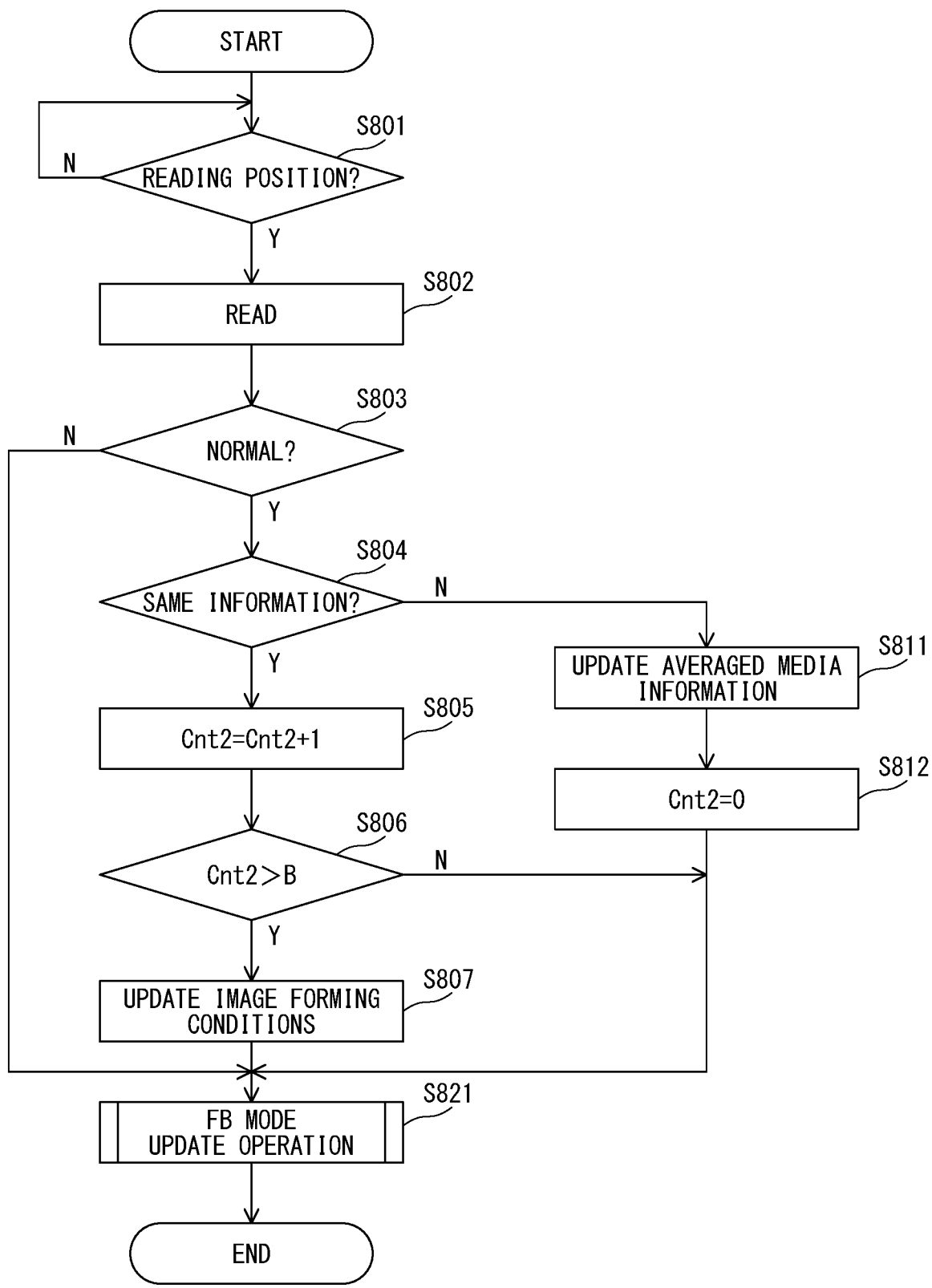
FIG. 10 is a flow chart for illustrating reading operation processing for the images for adjustment.

FIG. 10 is a flow chart for illustrating the reading operation processing for the image for adjustment on the sheet of Step S513. A case in which the chart 500 for adjustment is read by the CIS 321 is described below, but the same processing applies to a case in which the chart 500 for adjustment is read by the CIS 322.

The CPU 222 stands by until the chart 500 for adjustment reaches the reading position of the CIS 321 (N in Step S801). When the chart 500 for adjustment reaches the reading position of the CIS 321 (Y in Step S801), the CPU 222 reads the images 501 for adjustment by the CIS 321 (Step S802). The CPU 222 determines whether or not the reading results of the images 501 for adjustment are normal (Step S803). In this embodiment, for example, when the images 501 for adjustment cannot be read due to buckling of the chart 500 for adjustment at a corner or dust adhering to the reading sensor 351 of the CIS 321, the reading results are determined to be abnormal. Therefore, the CPU 222 determines whether or not output values of the images 501 for adjustment which have been output from the reading sensor 351 are within an allowable range. The CPU 222 determines that the reading results are normal when the output values are within the allowable range, and determines that the reading results are abnormal when the output values are out of the allowable range. The CPU 222 performs such determination on each sheet on which the images 501 for adjustment are formed.

When the reading results are determined to be normal (Y in Step S803), the CPU 222 determines whether or not the information on the sheet used as the chart 500 for adjustment and the averaged media information match (Step S804). When those pieces of information match (Y in Step S804), the CPU 222 adds "1" to the number-of-read-sheets counter value Cnt2 (Step S805). The CPU 222 determines whether or not the number-of-read-sheets counter value Cnt2 exceeds a threshold value B (predetermined number) of the number of sheets to be used for the averaging (Step S806). Thus, the CPU 222 determines whether or not the reading results of the images 501 for adjustment have been obtained continuously for a predetermined number of sheets. The threshold value B is herein, for example, "5."

When the number-of-read-sheets counter value Cnt2 exceeds the threshold value B (Y in Step S806), the CPU 222 determines that the number of sets of reading results of the images 501 for adjustment formed on the sheets of the same type has reached the number required for the averaging. In this case, the CPU 222 averages the reading results, and updates the image forming conditions held in the memory 223 to image forming conditions generated based on the averaged reading results (Step S807). In order to update the FB mode to be referred to in the processing step of Step S602 of FIG. 8, the CPU 222 executes an FB mode update operation (Step S821), and ends the processing. Details of the FB mode update operation are described later.

When the CPU 222 determines that the reading results are not normal in the processing step of Step S803 (N in Step S803), the CPU 222 skips the processing steps of from Step S804 to Step S807 to execute the FB mode update operation (Step S821), and ends the processing.

When the information on the sheet used as the chart 500 for adjustment and the averaged media information do not match (N in Step S804), the CPU 222 updates the averaged media information to media information on the sheet used as the chart 500 for adjustment (Step S811). The CPU 222 sets the number-of-read-sheets counter value Cnt2 to "0" (Step S812). After that, the CPU 222 executes the FB mode update operation (Step S821), and ends the processing.

When the number-of-read-sheets counter value Cnt2 does not exceed the threshold value B (N in Step S806), the CPU 222 skips the processing step of Step S807 to execute the FB mode update operation (Step S821), and ends the processing. That is, the FB mode update operation is performed when the number of sets of reading results is less than the predetermined number (threshold value B) required for the averaging. In this manner, which of the reading results by the CIS 321 and the reading results by the on-belt reading sensor 310 are to be used for generating image forming conditions is determined based on a result of the determination of whether or not the reading results of the images 501 for adjustment by the CIS 321 are abnormal.

Figure 11:
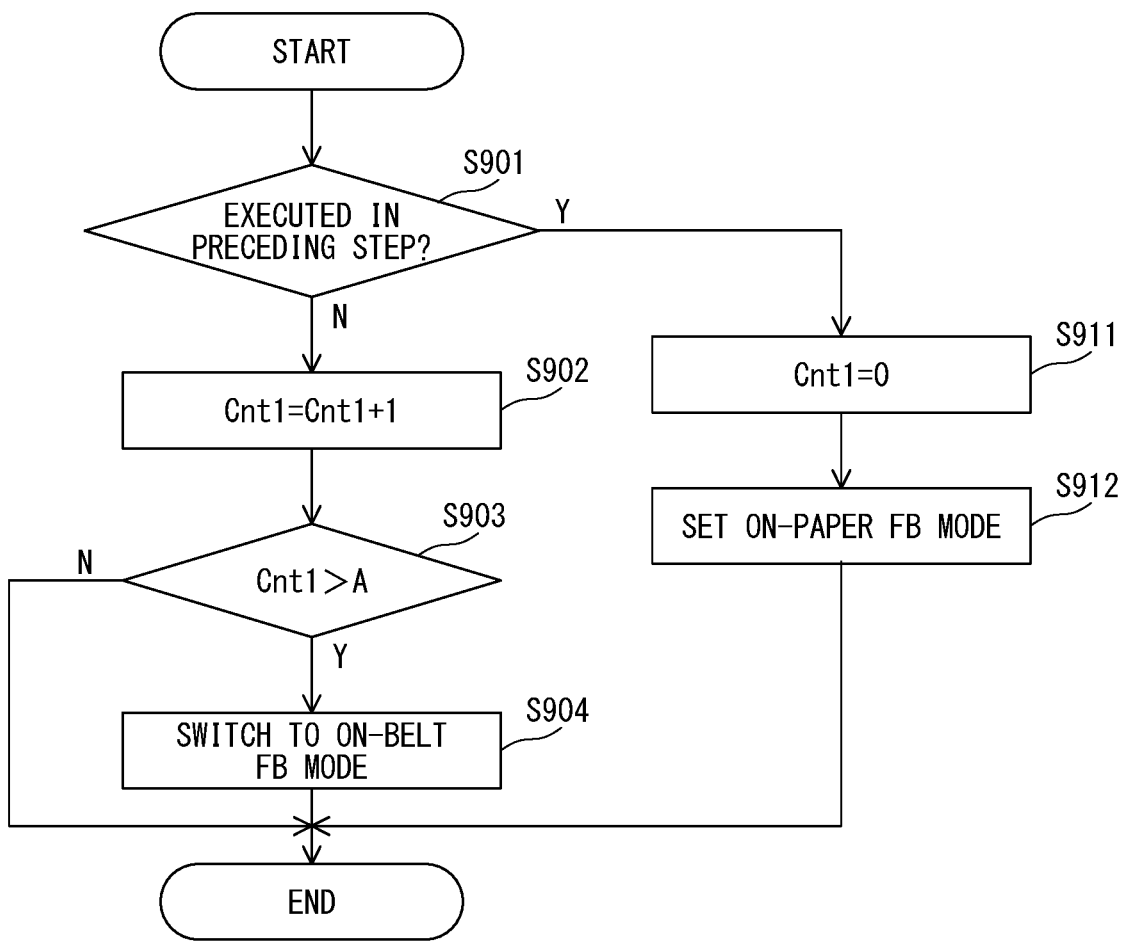
FIG. 11 is a flow chart for illustrating an FB mode update operation.

FIG. 11 is a flow chart for illustrating the FB mode update operation.

When the FB mode update operation is started, the CPU 222 determines whether or not the image forming conditions have been updated in the preceding processing step of Step S807 (Step S901). When the image forming conditions have not been updated (N in Step S901), the CPU 222 adds "1" to the on-paper FB non-execution counter value Cnt1 (Step S902). The CPU 222 determines whether or not the on-paper FB non-execution counter value Cnt1 exceeds a threshold value A for mode switching determination (Step S903). The threshold value A is larger than the threshold value B. It is assumed that the threshold value A is, for example, "10."

When the on-paper FB non-execution counter value Cnt1 exceeds the threshold value A (Y in Step S903), the CPU 222 determines that the adjustment of the image forming conditions using the chart 500 for adjustment has not been executed even after the images 501 for adjustment have been printed on a predetermined number of sheets. That is, when the number of sheets having the reading results determined to be abnormal after image forming conditions were generated last time reaches the threshold value A, the CPU 222 determines that the adjustment of the image forming conditions using the chart 500 for adjustment has not been executed. In this case, the CPU 222 switches the FB mode to the on-belt FB mode (Step S904), and ends the processing. When the on-paper FB non-execution counter value Cnt1 does not exceed the threshold value A (N in Step S903), the CPU 222 ends the processing without switching the FB mode.

When the image forming conditions have been updated in the preceding processing step (Y in Step S901), the CPU 222 sets the on-paper FB non-execution counter value Cnt1 to "0" (Step S911). The CPU 222 sets the FB mode to the on-paper FB mode (Step S912), and ends the processing.

With the above-mentioned processing, the FB mode is switched from the on-paper FB mode to the on-belt FB mode when the on-paper FB has not been executed for a reason that, for example, the reading of the images 501 for adjustment has failed or the sets of reading results corresponding to the number of sheets required for the averaging have not been provided. Therefore, when the calibration using the images 501 for adjustment on the chart 500 for adjustment has not been executed, the calibration using the images 502 for adjustment borne on the intermediate transfer belt 308 is executed. That is, when a condition for not executing the on-paper FB mode is satisfied, the calibration is executed based on the on-belt FB mode instead of the on-paper FB mode. Meanwhile, when a condition for enabling the execution of the on-paper FB mode is satisfied during the operation in the on-belt FB mode, the calibration based on the on-paper FB mode can be restarted.

Further, the image forming apparatus 101 according to this embodiment does not form the images 502 for adjustment when the on-belt detection is not to be executed. However, the CPU 222 may be configured to form, irrespective of whether or not the on-belt detection is to be executed, the images 502 for adjustment each time the on-belt detection execution counter value Cnt3 reaches the threshold value C. When it is determined that the on-belt detection is not to be executed in this image forming apparatus, the CPU 222 does not generate a γLUT based on the images 502 for adjustment read by the on-belt reading sensor 310. In another case, when it is determined that the on-belt detection is not to be executed in this image forming apparatus, the CPU 222 inhibits the on-belt reading sensor 310 from reading the images 502 for adjustment.

The image forming apparatus 101 according to this embodiment as described above executes the calibration based on the on-belt FB mode instead of the on-paper FB mode when the user selects the on-paper FB mode and the condition for not executing the on-paper FB mode is satisfied. With such switching of the mode, it is possible to appropriately adjust the image forming conditions and to form an image having stable image quality on the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-089376, filed May 27, 2021, which is hereby incorporated by reference herein in its entirety.

What is claimed is:

1. An image forming apparatus comprising:
   an image forming unit configured to form an image on an image bearing member based on an image forming condition;
   a transfer unit configured to transfer the image formed on the image bearing member onto a sheet;
   a first reading sensor configured to read a first image for adjustment which has been formed on the sheet;
   a second reading sensor configured to read a second image for adjustment which has been formed on the image bearing member; and
   a controller configured to:
      generate the image forming condition based on reading results of the first image for adjustment on a plurality of sheets, which are obtained by the first reading sensor; and
      generate the image forming condition based on a reading result of the second image for adjustment, which is obtained by the second reading sensor,
   wherein the controller is configured to:
      determine whether a reading result of the first image for adjustment, which has been obtained by the first reading sensor, is abnormal; and control, based on a result of the determination, whether to generate the image forming condition based on the reading result of the second image for adjustment, which has been obtained by the second reading sensor, without use of the reading results of the first image for adjustment on the plurality of sheets, which have been obtained by the first reading sensor.

2. The image forming apparatus according to claim 1, wherein the controller is configured to:
determine whether a reading result of the first image for adjustment, which has been obtained by the first reading sensor, is abnormal for each sheet on which the first image for adjustment has been formed; and
generate, when the number of sheets having the reading results determined to be abnormal after the image forming condition was generated last time reaches a threshold value, the image forming condition based on the reading result of the second image for adjustment, which has been obtained by the second reading sensor, without use of the reading results of the first image for adjustment on the plurality of sheets, which have been obtained by the first reading sensor.

3. The image forming apparatus according to claim 1, wherein the controller is configured to determine whether the image forming condition can be generated based on reading results of the first image for adjustment on another plurality of sheets, which have been obtained by the first reading sensor, after the image forming condition has been generated based on the reading result of the second image for adjustment, which has been obtained by the second reading sensor, without use of the reading results of the first image for adjustment on the plurality of sheets, which have been obtained by the first reading sensor.

4. An image forming apparatus comprising:
an image forming unit configured to form an image on an image bearing member based on an image forming condition;
a transfer unit configured to transfer the image formed on the image bearing member onto a sheet;
a first reading sensor configured to read a first image for adjustment which has been formed on the sheet;
a second reading sensor configured to read a second image for adjustment which has been formed on the image bearing member; and
a controller configured to:
generate the image forming condition based on reading results of the first image for adjustment on a plurality of sheets, which are obtained by the first reading sensor; and
generate the image forming condition based on a reading result of the second image for adjustment, which is obtained by the second reading sensor,
wherein the controller is configured to:
determine whether a paper type of the sheet on which the first image for adjustment is formed has changed; and
control, based on a result of the determination, whether to generate the image forming condition based on the reading result of the second image for adjustment, which has been obtained by the second reading sensor, without use of the reading results of the first image for adjustment on the plurality of sheets, which have been obtained by the first reading sensor.

5. The image forming apparatus according to claim 4, wherein the controller is configured to:
count the number of times that the paper type of the sheet on which the first image for adjustment is formed has changed before reading results of the first image for adjustment on sheets of the same paper type have been obtained by the first reading sensor continuously for a predetermined number of sheets; and
generate, when the counted number of times reaches a threshold value, the image forming condition based on the reading result of the second image for adjustment, which has been obtained by the second reading sensor, without use of the reading results of the first image for adjustment on the plurality of sheets, which have been obtained by the first reading sensor.

6. The image forming apparatus according to claim 4, wherein the controller is configured to determine whether the image forming condition can be generated based on reading results of the first image for adjustment on another plurality of sheets, which have been obtained by the first reading sensor, after the image forming condition has been generated based on the reading result of the second image for adjustment, which has been obtained by the second reading sensor, without use of the reading results of the first image for adjustment on the plurality of sheets, which have been obtained by the first reading sensor.

\* \* \* \* \*